(12) United States Patent
Ishikawa (10) Patent No.: US 7,447,465 B2
(45) Date of Patent: Nov. 4, 2008

(54) MULTI-FUNCTION PERIPHERAL

(75) Inventor: Kan Ishikawa, Aichi-ken (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1459 days.

(21) Appl. No.: 10/325,889

(22) Filed: Dec. 23, 2002

(65) Prior Publication Data
US 2003/0123086 A1 Jul. 3, 2003

(30) Foreign Application Priority Data
Dec. 21, 2001 (JP) ............................. 2001-389665

(51) Int. Cl.
*G03G 15/00* (2006.01)
(52) U.S. Cl. .................... 399/110; 399/126; 399/155; 399/165; 399/202; 399/211; 399/261; 399/319; 358/3.26; 358/504; 358/505; 358/406; 347/27; 347/70
(58) Field of Classification Search ............... 399/110, 399/126, 155, 165, 202, 211, 261, 319; 347/27, 347/70; 358/3.26, 504, 505, 406
See application file for complete search history.

(56) References Cited

FOREIGN PATENT DOCUMENTS

| JP | A 08-171326 | 7/1996 |
|---|---|---|
| JP | A 10-336406 | 12/1998 |
| JP | A 11-139104 | 5/1999 |
| JP | A 2000-141800 | 5/2000 |
| JP | A 2001-317591 | 11/2001 |
| JP | A 2001-339558 | 12/2001 |

*Primary Examiner*—David Moore
*Assistant Examiner*—Vu B Hang
(74) *Attorney, Agent, or Firm*—Oliff & Berridge, PLC

(57) ABSTRACT

A multi-function peripheral includes an image forming unit having an image forming device, and an image reading unit having an image reading device and located above the image forming unit. The image forming device forms an image on a recording sheet with moving a carriage reciprocally in a predetermined horizontal direction. The image reading device reads an image of an object by moving an image capturing element in the predetermined horizontal direction when the image forming unit operates. Spring elements are provided between the image forming unit and the image reading unit to apply an urging force therebetween in a direction parallel to the predetermined horizontal direction. The spring elements satisfy the following condition:

$$\frac{f}{f_n} > \sqrt{2},$$

where, $f$ and $f_n$ are characteristic frequencies of the image forming unit and the image reading unit, respectively, in the predetermined horizontal direction.

16 Claims, 7 Drawing Sheets

MULTI-FUNCTION PERIPHERAL

BACKGROUND OF THE INVENTION

The present invention relates to a multi-function peripheral, and more particularly to a multi-function peripheral having an image forming function and an image capturing function.

Conventionally, a multi-function peripheral having an image forming function such as a printer function or a facsimile function, and an image reading function such as a scanner function has been known. Such an apparatus can also be used as a copier. That is, an image of an original captured with the scanner function is printed on a recording sheet with the printer function. There are apparatuses which can print the image of the original with scanning the original.

Figure 1:
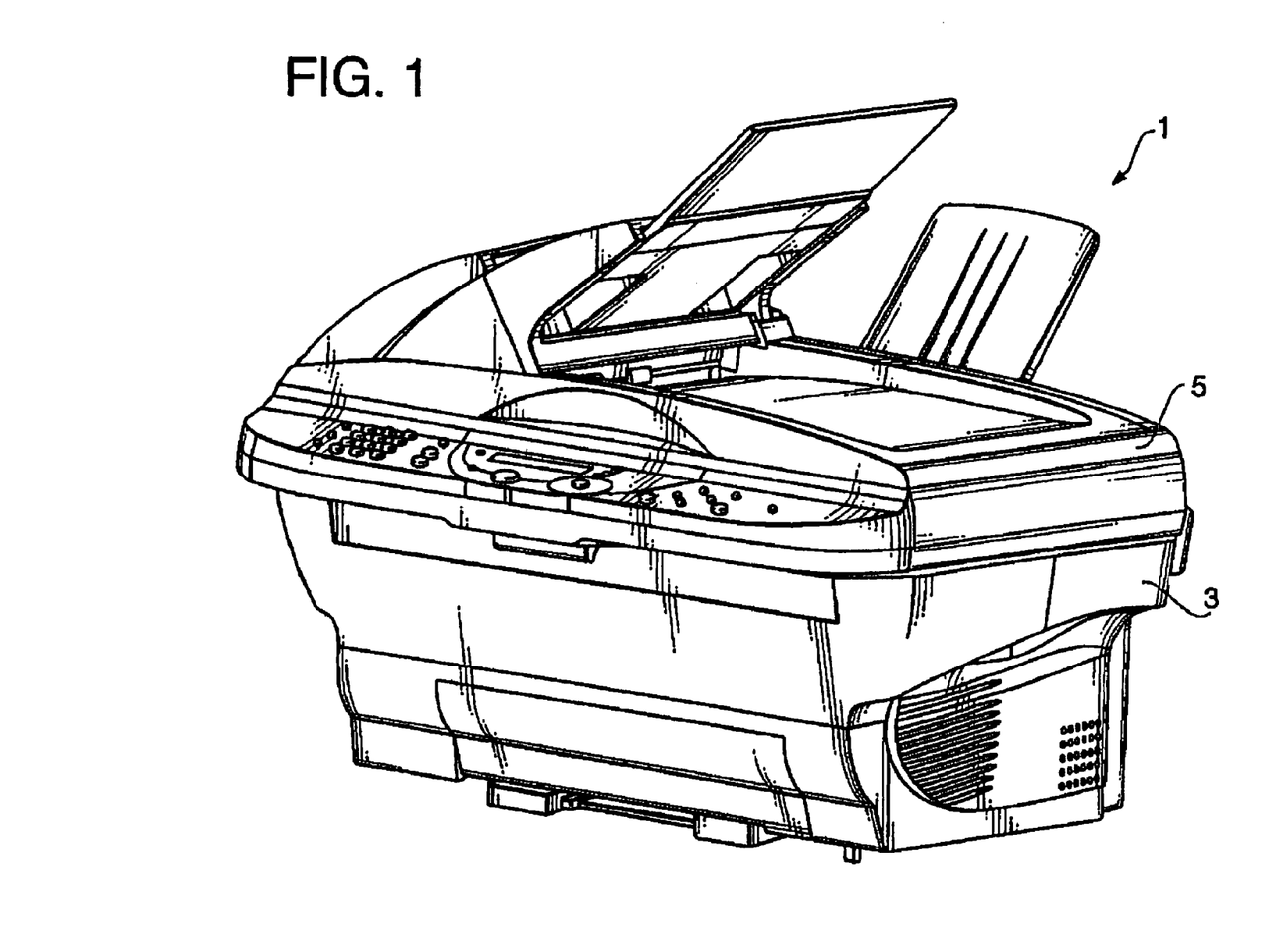
FIG. 1 shows an appearance of a multi-function peripheral.

FIG. 1 shows an appearance of such a multi-function peripheral. In this example, the multi-function peripheral has a main body 3, in which the image forming function is implemented. On an upper surface of the main body 3, a cover 5 is provided, in which the scanning function is implemented. Hereinafter, the main body 3 will also be referred to as an imaging unit 3, and the cover 5 is referred to as a scanning unit 5.

The imaging unit 3 employs an electrophotograpic imaging process, inkjet printing process or the like. In either method, the recording sheet is fed in an auxiliary scanning direction which is perpendicular to a main scanning direction (i.e., in a laser scanning direction in the former case, or in a direction where a carriage mounting an inkjet head reciprocates) so that a two-dimensional image is formed.

The scanning unit 5 typically employs an image capturing element such as a CCD (Charge Coupled Device) or a CIS (Contact Image Sensor). In one type, the image capturing element is fixed to the apparatus, and the original is fed with respect to the apparatus. In another type, the original is placed on a predetermined position and the image capturing element is moved with respect to the original.

The image capturing element is generally configured such that a line of image extending in the main scanning direction, which is perpendicular to the feeding direction of the original (or the image capturing element), and as the image capturing element is fed relatively to the original from one end to the other end of the original, the two-dimensional image formed on the original is captured. In the apparatus in which the image capturing element is moved, it is returned to its initial position after an original is scanned.

Figure 2A:
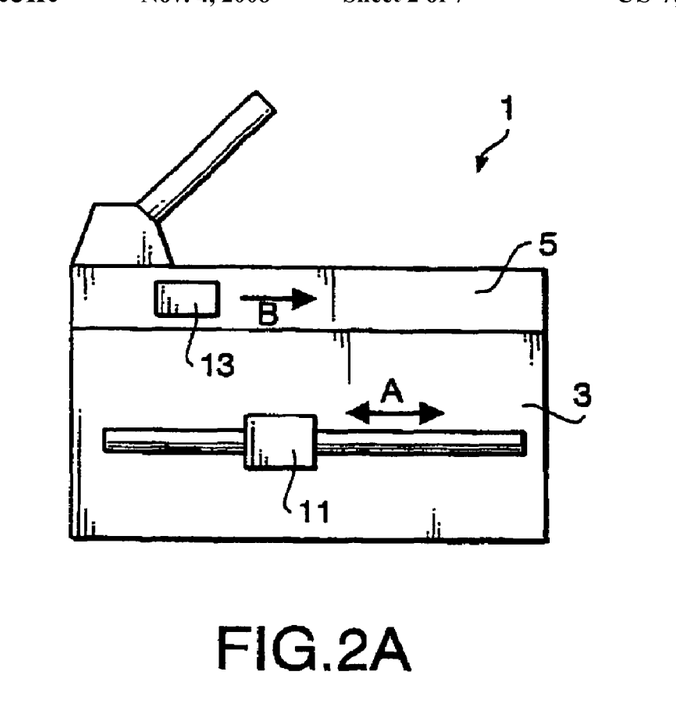
FIGS. 2A and 2B schematically shows a structure related to the present invention.

FIG. 2A shows directions in which the image capturing element and the carriage move. FIG. 2A shows moving directions of the image capturing element and the carriage viewed from a front side. As shown in FIG. 2A, in the imaging unit 3, a carriage 11 moves in a direction indicated by arrow A in a horizontal plane (which is a plane perpendicular to a plane of FIG. 2A and is parallel with a right-and-left hand direction in FIG. 2A), and forms an image on a sheet with use of the inkjet printing method.

The scanning unit 5 is configured such that a CCD 13 moves in a direction indicated by arrow A in the horizontal plane to capture a two-dimensional image of the original placed on a upper surface of the main body 5. After the image is captured, the CCD 13 returns to its initial position which is the position shown in FIG. 2A. In this example, the scanning unit 5 is capable of scanning a color image.

When the scanning function and the image forming function are actuated simultaneously in the multi-function peripheral configured as above, as the carriage 11 reciprocates, vibration is generated, which may deteriorate a quality of an image scanned by the scanning unit 5. That is, a moving speed of the imaging element 13, which should move at a predetermined constant speed, may fluctuate due to the vibrations generated by the reciprocal movement of the carriage 11 and causes a color shift of the captured image. Even when the CCD 13 does not read a color image, the uneven moving speed deteriorates the scanned image.

SUMMARY OF THE INVENTION

The present invention is advantageous in that the above-described problem can be resolved. That is, an improved multi-function peripheral is provided in which, when the image capturing element and the carriage move simultaneously, deterioration of the captured image can be prevented.

According to an aspect of the invention, there is provided a multi-function peripheral, which is provided with an image forming device including a carriage, the imaging unit forming an image on a recording sheet with moving the carriage reciprocally in a predetermined horizontal direction, and an image reading device that reads an image of an object by moving an image capturing element in the predetermined horizontal direction when the image forming unit forms an image on the recording sheet. The multi-function peripheral is further provided with an image forming unit including the image forming device, an image reading unit including the image reading device and located above the image forming unit, and spring elements provided between the image forming unit and the image reading unit. The spring elements apply an urging force between the image forming unit and the image reading unit in a direction parallel to the predetermined horizontal direction. According to an embodiment, the spring elements are configured to satisfy the following condition:

$$\frac{f}{f_n} > \sqrt{2},$$

where, f is a characteristic frequency of the image forming unit in the predetermined horizontal direction, and $f_n$ is a characteristic frequency of the image reading unit.

With this configuration, a displacement transmission ratio Md is less than one, and accordingly, the vibration canceling effect can be achieved.

Optionally, the multi-function peripheral may satisfy a following condition:

$$k > \frac{W\sin\theta - Fr}{\delta},$$

where, W represents a weight of the image forming unit, $\delta$ represents an allowance of displacement of the image forming unit in the predetermined horizontal direction, Fr represents a frictional load of the image reading unit in the predetermined horizontal direction, $\theta$ represents an allowed inclination angle of the multi-function peripheral, and k represents a spring constant of the spring elements.

In a particular case, the spring elements may include a plurality of coil springs.

According to an embodiment, the image reading unit is provided with at least three wheels with which the image reading unit is movably mounted on the image forming unit so as to be movable in the predetermined horizontal direction.

Optionally, the image capturing element captures a color image of the object. Alternatively, the image capturing element may captures a monochromatic image of the object.

According to an embodiment, the multi-function peripheral may include a mechanism which allows relative movement of the image reading unit with respect to the image forming unit only in the predetermined horizontal direction.

Optionally or alternatively, the multi-function peripheral may include another mechanism which inhibits relative movement of the image reading unit with respect to the image forming unit in a direction perpendicular to the predetermined horizontal direction.

Still optionally, the multi-function peripheral may include a restricting mechanism which restricts relative movement of the image reading unit with respect to the image forming unit in the predetermined horizontal direction within a predetermined range.

According to another aspect of the invention, there is provided a multi-function peripheral, which is provided with an image forming device including a carriage, the imaging unit forming an image on a recording sheet with moving the carriage reciprocally in a predetermined horizontal direction, an image reading device that reads an image of an object by moving an image capturing element in the predetermined horizontal direction when the image forming unit forming an image on the recording sheet. The multi-function peripheral is further provided with an image forming unit including the image forming device, an image reading unit including the image reading device and located above the image forming unit, a guiding mechanism that guides the image reading unit with respect to the image reading unit in a direction parallel to the predetermined horizontal direction, and spring elements provided between the image forming unit and the image reading unit. The spring elements apply an urging force between the image forming unit and the image reading unit in a direction parallel to the predetermined horizontal direction.

Optionally, the multi-function peripheral may satisfy the following condition:

$$k < 2\pi^2 \cdot f^2 \cdot m,$$

where, f is a characteristic frequency of the image forming unit in the predetermined horizontal direction, m represents a mass of the image forming unit, and k represents a spring constant of the spring elements.

Further, the multi-function peripheral may satisfy the following condition:

$$k > \frac{W \sin\theta - Fr}{\delta},$$

where, W represents a weight of the image forming unit, $\delta$ represents an allowance of displacement of the image forming unit in the predetermined horizontal direction, Fr represents a frictional load of the image reading unit in the predetermined horizontal direction, and $\theta$ represents an allowed inclination angle of the multi-function peripheral.

DESCRIPTION OF THE EMBODIMENT

Hereinafter, a multi-function peripheral employing a vibration cancelling mechanism according to an embodiment of the invention will be described with reference to the accompanying drawings.

It should be noted that since the appearance of the multi-function peripheral is not essential and can be similar to that of the conventional apparatus, the multi-function peripheral 1 shown in FIG. 1 is now assumed to be the appearance of the apparatus employing the vibration cancelling mechanism according to the embodiment of the invention.

Firstly, the multi-functional peripheral (hereinafter referred to as MFP) 1 is regarded as a single-degree-of-freedom (SDF) basic vibration model. In this model, by connecting an inertia element (i.e., the scanning unit 5) and the main body (imagine unit) 3 with spring elements 15, a vibration cancelling mechanism is realized (see FIG. 2B). In this model, a mass of the scanning unit 5 is represented by m (kg).

Figure 2B:
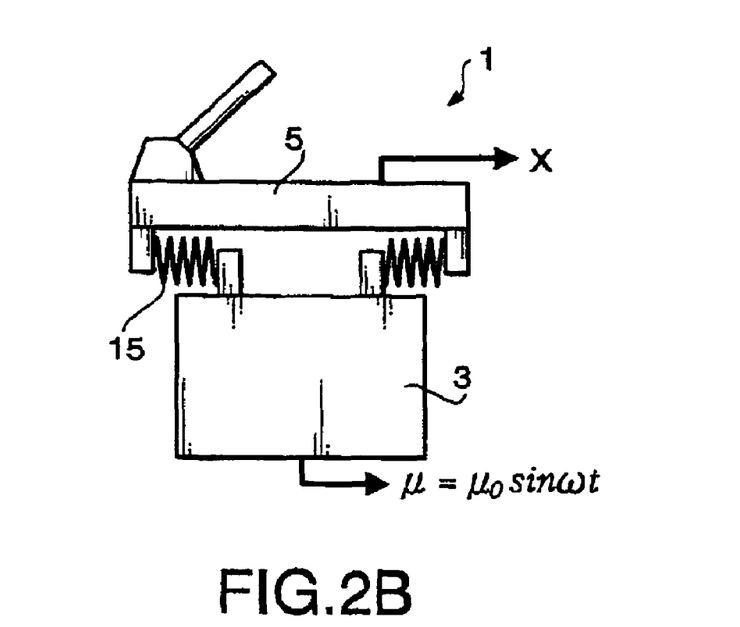

In this model, when a displacement $\mu$ of the main body is represented by $$\mu = \mu_0 \sin \omega t \tag{1}$$

where $\mu_0$ is a constant, an amplitude of vibration transmitted to the inertia element is expressed by a following equation:

$$Md = \sqrt{\frac{1 + \left(2\zeta\frac{\omega}{\omega_n}\right)^2}{\left[1 - \left(\frac{\omega}{\omega_n}\right)^2\right]^2 + \left(2\zeta\frac{\omega}{\omega_n}\right)^2}} \tag{2}$$

where, $\omega_n$ represents a characteristic angular frequency of the system, and $\zeta$ is an attenuation coefficient ratio, which are expressed by following equations:

$$\omega_n = \sqrt{\frac{k}{m}} \tag{3}$$

$$\zeta = \frac{c}{2\sqrt{mk}} \tag{4}$$

where, k is a spring constant, c is an attenuation constant of an attenuation element (not shown in FIG. 2B) inherent in the vibration system.

Figure 3:
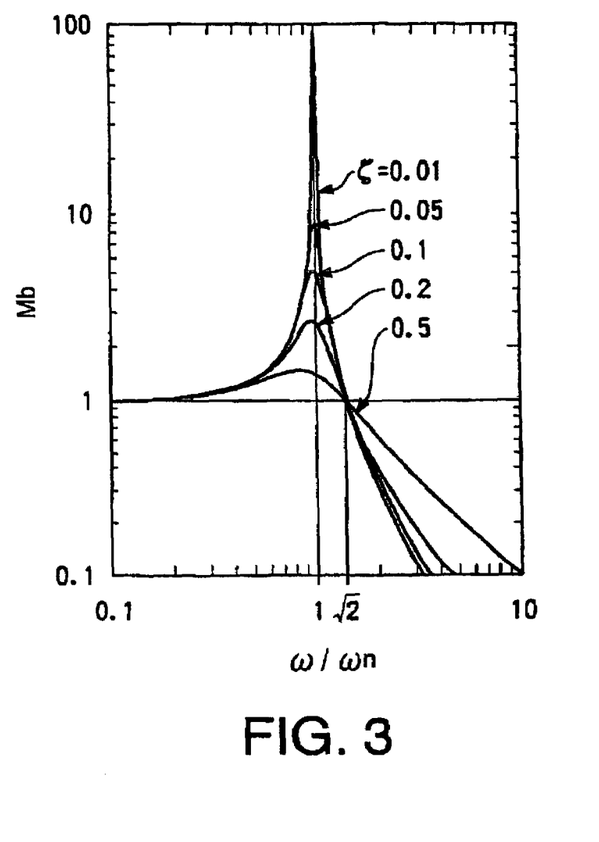
FIG. 3 is a graph showing a relationship between a displacement-transmitting ratio and an angular frequency ratio.

A relationship between the displacement transmission ratio Md and an angular frequency ratio is shown in FIG. 3.

It should be noted that, in FIG. 3, the horizontal axis shows $\omega/\omega_n$. However, since $\omega = 2\pi f$ (f is a frequency (Hz)), $\omega/\omega_n = f/f_n$.

It is appreciated from the graph shown in FIG. 3, when a condition:

$$\frac{f}{f_n} > \sqrt{2} \quad (5)$$

is satisfied, Md<1, and the vibration cancelling effect can be obtained.

From the equation (3), the condition (5) can be expressed such that:

$$k < 2\pi^2 \cdot f^2 \cdot m \quad (6)$$

Figure 4:
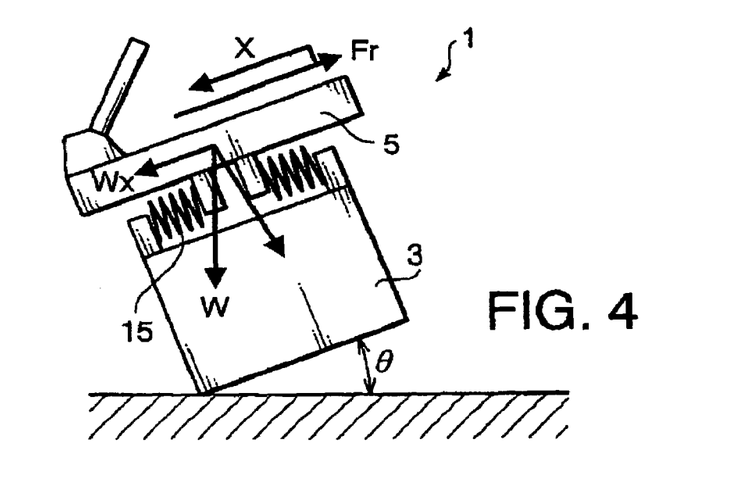
FIG. 4 illustrates a function of spring elements employed in a vibration cancelling mechanism.

Next, an inclination of the apparatus will be considered with reference to FIG. 4.

When the MFP 1 inclines by θ as shown in FIG. 4, an X-axis component of the weight of the MFP is expressed as follows.

$$W_x = W \sin \theta \quad (7)$$

where, W represent a weight of the scanning unit 5 and expressed such that W=mg (g is an acceleration of gravity), and X-axis represents a moving direction of the scanning unit 5.

Given that δ is an allowable moving amount of the scanning unit 5 in the X-axis direction, the maximum force $F_{lim}$ of the spring when the scanning unit 5 moves by the amount δ is expressed by equation (8).

$$F_{lim} = k\delta \quad (8)$$

When a friction load of the scanning unit 5 is represented by F4, a condition for a displacement of the scanning unit 5 in the X-axis direction when the MFP 1 inclines by θ being less than the amount δ is as follows.

$$W_x - Fr < F_{lim} = k\delta \quad (9)$$

Condition (9) is rewritten as condition (10).

$$k > \frac{W \sin \theta - Fr}{\delta} \quad (10)$$

Accordingly, if the spring constant k is set within a range defined by conditions (6) and (10), the vibration cancelling effect can be obtained, and even when the MFP is inclined by θ [rad], the displacement of the scanning unit 5 is suppressed within the allowable range.

The vibration cancelling mechanism employed in the MFP 1 according to the embodiment will be described in detail.

FIGS. 5A through 5E show a structure of the vibration cancelling mechanism of the multi-function peripheral 1.

Figure 5A:
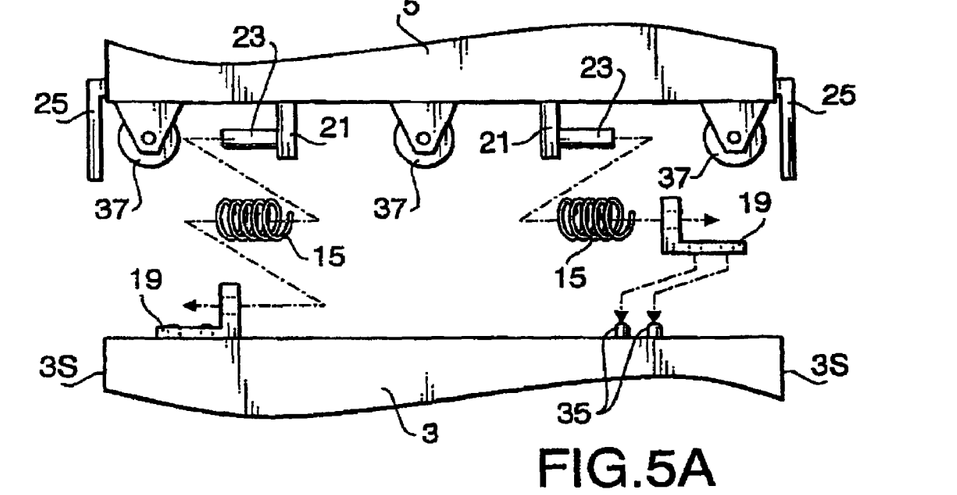
FIGS. 5A through 5E show a structure of the vibration cancelling mechanism.
Figure 5B:
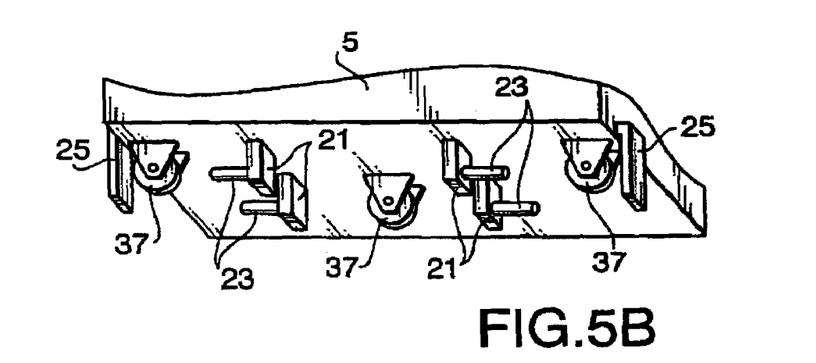
Figure 5C:
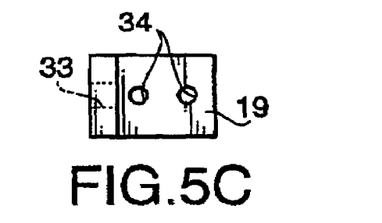
Figure 5D:
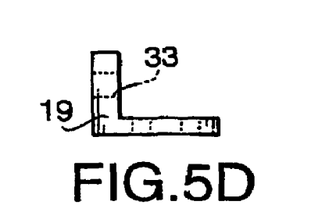
Figure 5E:
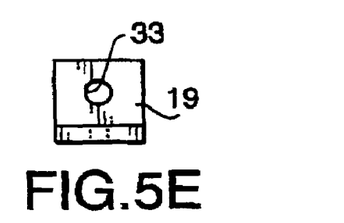

FIG. 5A is an exploded front view of the vibration cancelling mechanism and FIG. 5B is a perspective view (viewed from the bottom) of a part of the vibration cancelling mechanism provided to the scanning unit 5. FIG. 5C through 5E show a structure of a spring stopper 19.

According to the embodiment, the spring elements 15 indicated in FIG. 4 is realized as compression springs provided between spring stoppers 19 secured on the imaging unit 3 and cylindrical spring guides 23 protruded from brackets 21 secured to the scanning unit 5, respectively. As shown in FIG. 5B, there are four sets of brackets 21 and spring guides 19 secured on the bottom surface of the scanning unit 5, and corresponding thereto, for stoppers 19 are provided on the upper surface of the imaging unit 3, although all of them are not shown in the drawings. In each structure, a through hole 33 is formed on the spring stopper 19, in which the cylindrical spring guide 23 is fitted with the compression spring 15 being wound therearound.

The displacement of the scanning unit 5 in the X-axis direction (i.e., right-and-left hand direction in FIG. 5A) is restricted by scanning unit stoppers 25. As shown in FIG. 5A, each scanning unit stopper 25 extends in the up-and-down direction of the drawing to a level below three wheels 37. As will be described, when the scanning unit 5 is mounted on the imaging unit 3, the wheels 37 rotatably contact the upper surface of the imaging unit 3. The scanning unit stoppers 25 are configured such that the end portions of the scanning unit stoppers 25 can contact the side surfaces 3S, in the X-axis direction, of the imaging unit 3 when the scanning unit 5 is mounted on the imaging unit 3 and moved in the X-axis direction. A distance between the scanning unit stoppers 25 in the X-axis direction is slightly longer than the distance between the side surfaces 3S of the imaging unit. Thus, the movable range of the scanning unit 5, in the X-axis direction, with respect to the imaging unit 3 is restricted by the scanning unit stoppers 25. The displacement of the scanning unit 5 in the directions perpendicular to the X-axis direction is restricted by the engagement of spring guides 23 with the through holes 33 formed on the spring stoppers 19.

Each of the spring stoppers 19 is formed with openings 34, as shown in FIG. 5C, which engage with protrusions 35 (see FIG. 5A) formed on the upper surface of the imaging unit 3, thereby the spring stoppers 19 being fixed on the imaging unit 3.

As shown in FIG. 5B, three wheels 37 are provided on the bottom surface of the scanning unit 5 and the scanning unit 5 is mounted so as to be movable in the X-axis direction on the upper surface of the imaging unit 3.

With the above-described structure, by varying the spring constant k, experiments have been held to measure the vibration cancelling effect. Prior to the experiments, in order to estimate the characteristic angular frequency ω of the imaging unit 3, the displacement of the scanning unit 5 is measured under a condition where the carriage 11 is started to move, with acceleration, from a distance of 0 mm to a distance of 18 mm, at which (where the distance is 18 mm) the speed of the carriage 11 reaches 1.016 m/sec. The measurement is also performed by moving the carriage 11 similarly but in the opposite direction.

Figure 6A:
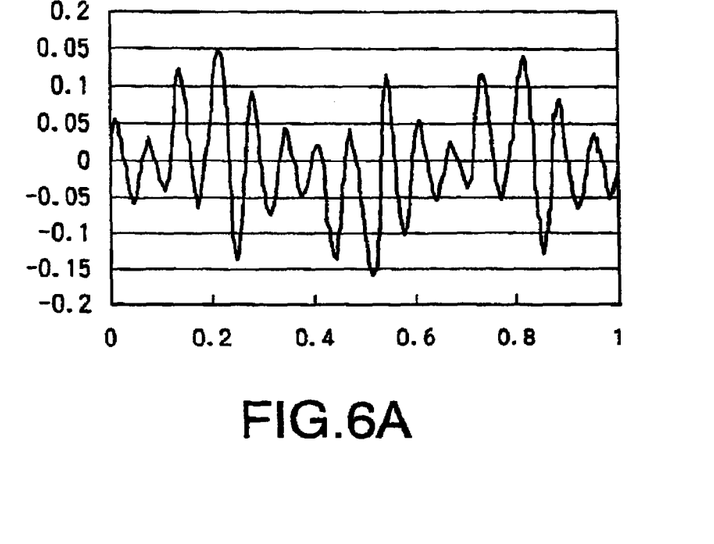
FIGS. 6A and 6B are graphs showing results of experiment of a characteristic frequency of the multi-function peripheral.
Figure 6B:
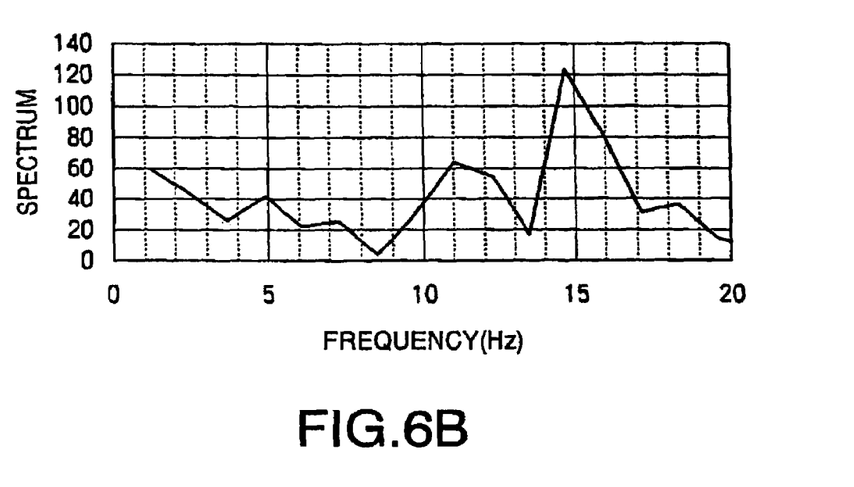

FIG. 6A is a graph showing the measured results, in which the horizontal axis represents time durations (unit:seconds), and the vertical axis shows the amplitude (unit:mm). FIG. 6B is a graph which is spectral representation of the measured results, in which the horizontal axis represents the frequency (unit:Hz) and the vertical axis represents the quantity.

It is appreciated from the graphs that the amplitude is ±0.15 mm, and the peak frequency is 15 Hz. Therefore, it is determined that the characteristic frequency is 15 Hz.

From the condition (5) and the characteristic frequency (f=15 Hz), $f_n$<10.6 Hz. From condition (6), k<17034 (N/m), where m is 3.9 (kg).

In the experiments, three kinds of springs A-C indicated in TABLE 1 are used.

TABLE 1

| SPRING | SPRING CONSTANT | CHARACTERISTIC FREQUENCY |
|---|---|---|
| A | 627 | 2.0 |
| B | 1411 | 3.0 |
| C | 2587 | 4.1 |

It should be noted that four springs are provided in the vibration cancelling mechanism, the spring constant for one spring is a quarter of the value indicated in TABLE 1.

With use of the above springs, the carriage 11 is moved under the same condition described above, and an image is scanned and transmitted to a computer. When the image is scanned, the resolution is 300 dpi×300 dpi (i.e., 11.8 dots per 1 mm in both the main and auxiliary scanning directions), and the image is scanned to obtain a 24-bit color image.

In each case where the springs are used, the color shift of the scanned image is well suppressed in comparison with a case where the vibration cancelling mechanism is not employed.

Figure 7:
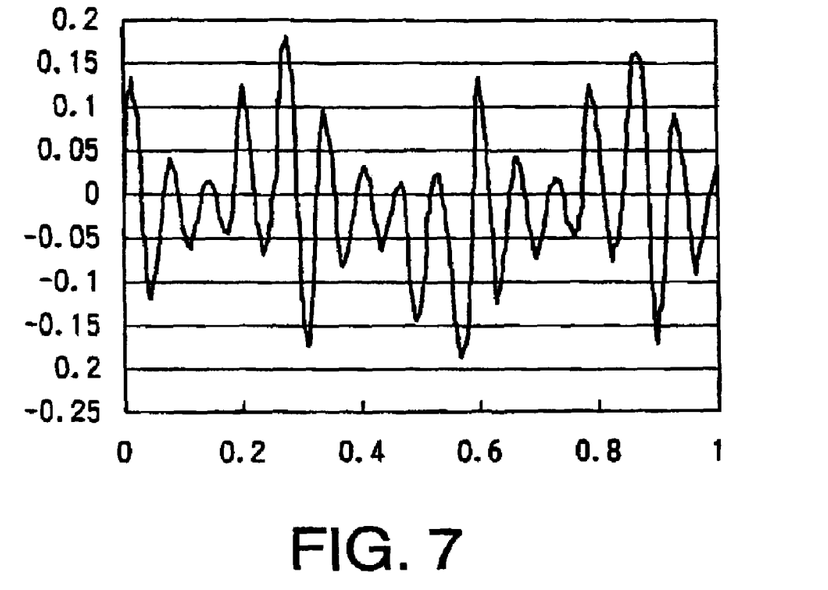
FIG. 7 is a graph showing effect of the vibration.
Figure 8A:
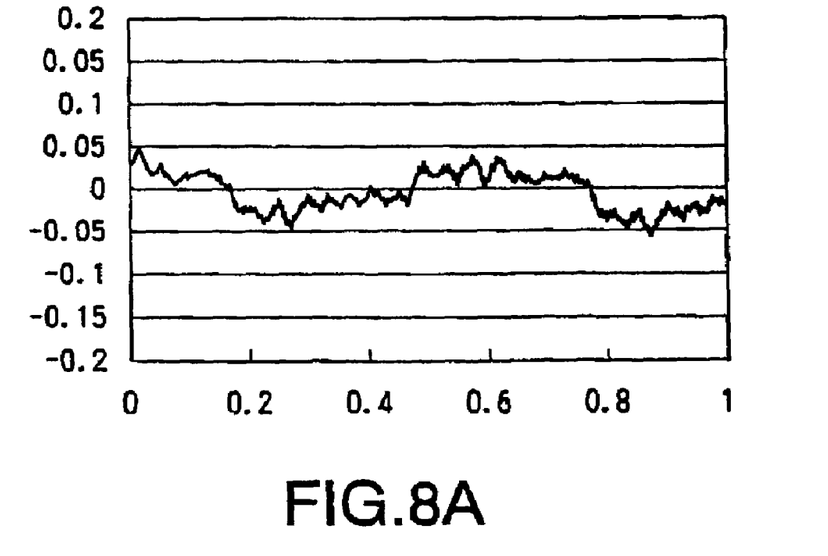
FIGS. 8A through 8C are graphs showing effect of a vibration cancelling mechanism.
Figure 8B:
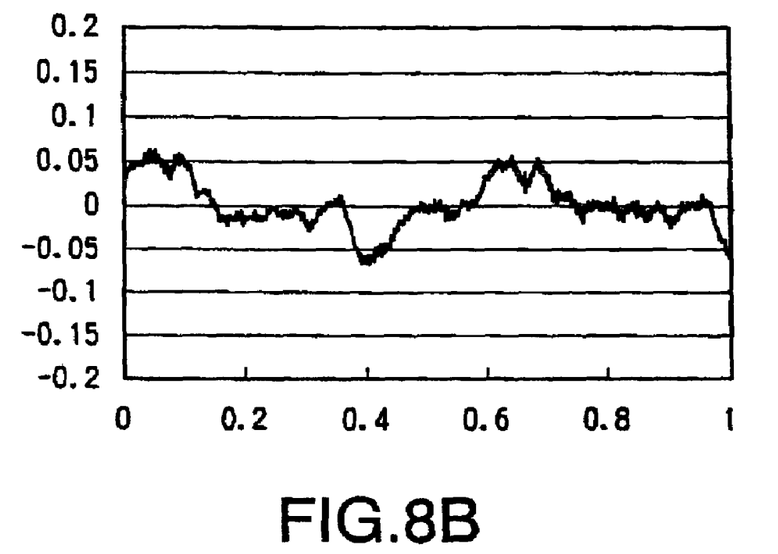
Figure 8C:
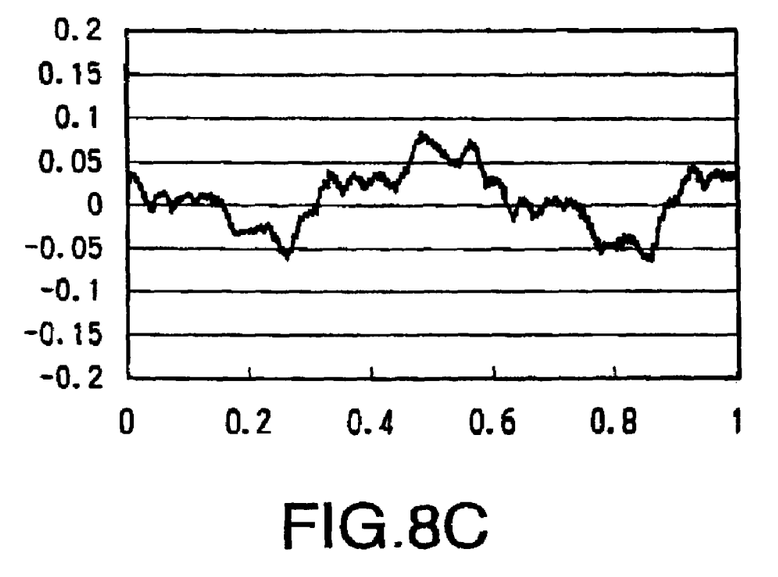

Next, with use of the springs A-C, displacements of the scanning unit 5 when the carriage 11 is moved are measured, respectively. The measured results are indicated in FIGS. 7 (no springs), 8A (springs A), 8B (springs B) and 8C (springs C). In FIGS. 7 and 8A-8C, the horizontal axes represent the duration of time (unit:seconds) and the vertical axes represent the amplitude (unit:mm). TABLE 2 shows numerical representation of the amplitude.

TABLE 2

| SPRING | AMPLITUDE (one side) |
|---|---|
| A | 0.04 |
| B | 0.06 |
| C | 0.07 |

As shown in FIGS. 7 and 8A-8C, and TABLE 2, when the springs are used, the amplitude is well suppressed (0.04-0.07 mm) in comparison with a case when no springs are used (0.15 mm). Further, as described above, when the spring constant is smaller, the amplitude is also smaller.

It should be noted that the above-described embodiment is an exemplary embodiment and the invention is not limited to the structure described above. Rather, various modification can be available without departing from the gist of the invention.

For example, the imaging unit 3 need not be limited to one employing an inkjet printing head. Any other imaging system, for example, a thermal transfer imaging system in which a carriage mounting a thermal transfer head reciprocates may also be subject to the invention.

Further, the scanning unit 5 may employ a CIS instead of CCD. Furthermore, the scanning unit 5 may capture a monochromatic image instead of a color image.

In the embodiment, compression springs are employed as spring elements. However, the invention need not limited to this structure. The term "spring elements" are intended to any suitable elements having the vibration cancelling function and includes tension springs, plate springs, rubber and equivalence thereof.

Furthermore, the configuration of the vibration cancelling mechanism need not be limited to that shown in FIG. 5B, and any other type of oscillation system which functions to suppress or cancel the vibration may be employed.

The present disclosure relates to the subject matter contained in Japanese Patent Application No. 2000-389665, filed on Dec. 21, 2001, which is expressly incorporated herein by reference in its entirety.

What is claimed is:

1. A multi-function peripheral, comprising:
   an image forming device including a carriage, said imaging unit forming an image on a recording sheet with moving said carriage reciprocally in a predetermined horizontal direction;
   an image reading device that reads an image of an object by moving an image capturing element in the predetermined horizontal direction when said image forming unit forming an image on the recording sheet;
   an image forming unit including said image forming device;
   an image reading unit including said image reading device and located above said image forming unit;
   spring elements provided between said image forming unit and said image reading unit, said spring elements applying an urging force between said image forming unit and said image reading unit in a direction parallel to the predetermined horizontal direction,
   wherein following condition:

$$\frac{f}{f_n} > \sqrt{2}$$

is satisfied,
   wherein, f is a characteristic frequency of said image forming unit in the predetermined horizontal direction, and
   wherein $f_n$ is a characteristic frequency of said image reading unit.

2. The multi-function peripheral according to claim 1, wherein a following condition:

$$k > \frac{W\sin\theta - Fr}{\delta}$$

is satisfied,
   wherein W represents a weight of said image forming unit,
   δ represents an allowance of displacement of said image forming unit in said predetermined horizontal direction,
   Fr represents a frictional load of said image reading unit in the predetermined horizontal direction,
   θ represents an allowed inclination angle of said multi-function peripheral, and
   k represents a spring constant of said spring elements.

3. The multi-function peripheral according to claim 1, wherein said spring elements include a plurality of coil springs.

4. The multi-function peripheral according to claim 1, wherein said image reading unit is provided with at least three wheels with which said image reading unit is movably mounted on said image forming unit so as to be movable in the predetermined horizontal direction.

5. The multi-function peripheral according to claim 1, wherein said image capturing element captures a color image of the object.

6. The multi-function peripheral according to claim 1, further including a mechanism which allows relative movement of said image reading unit with respect to said image forming unit only in the predetermined horizontal direction.

7. The multi-function peripheral according to claim 1, further including a mechanism which inhibits relative movement of said image reading unit with respect to said image forming unit in a direction perpendicular to the predetermined horizontal direction.

8. The multi-function peripheral according to claim 1, further including a mechanism which restricts relative movement of said image reading unit with respect to said image forming unit in the predetermined horizontal direction in a predetermined range.

9. A multi-function peripheral, comprising:
   an image forming device including a carriage, said imaging unit forming an image on a recording sheet with moving said carriage reciprocally in a predetermined horizontal direction;

an image reading device that reads an image of an object by moving an image capturing element in the predetermined horizontal direction when said image forming unit forming an image on the recording sheet;

an image forming unit including said image forming device;

an image reading unit including said image reading device and located above said image forming unit;

a guiding mechanism that guides said image reading unit with respect to said image reading unit in a direction parallel to the predetermined horizontal direction; and spring elements provided between said image forming unit and said image reading unit, said spring elements applying an urging force between said image forming unit and said image reading unit in a direction parallel to the predetermined horizontal direction.

10. The multi-function peripheral according to claim 9, wherein a following condition:

$$k < 2\pi^2 \cdot f^2 \cdot m$$

is satisfied, wherein, f is a characteristic frequency of said image forming unit in the predetermined horizontal direction, m represents a mass of said image forming unit, and k represents a spring constant of said spring elements.

11. The multi-function peripheral according to claim 10, wherein a following condition:

$$k > \frac{W \sin\theta - Fr}{\delta}$$

is satisfied, wherein, W represents a weight of said image forming unit,

δ represents an allowance of displacement of said image forming unit in said predetermined horizontal direction, Fr represents a frictional load of said image reading unit in the predetermined horizontal direction, and θ represents an allowed inclination angle of said multi-function peripheral.

12. The multi-function peripheral according to claim 9, wherein said spring elements include a plurality of coil springs.

13. The multi-function peripheral according to claim 9, wherein said image reading unit is provided with at least three wheels with which said image reading unit is movably mounted on said image forming unit so as to be movable in the predetermined horizontal direction.

14. The multi-function peripheral according to claim 9, wherein said image capturing element captures a color image of the object.

15. The multi-function peripheral according to claim 9, further including a mechanism which inhibits relative movement of said image reading unit with respect to said image forming unit in a direction perpendicular to the predetermined horizontal direction.

16. The multi-function peripheral according to claim 9, further including a mechanism which restricts relative movement of said image reading unit with respect to said image forming unit in the predetermined horizontal direction in a predetermined range.

* * * * *